(12) United States Patent
Jansen et al.

(10) Patent No.: US 10,773,979 B2
(45) Date of Patent: Sep. 15, 2020

(54) PASSIVE FLUID TREATMENT ASSEMBLY (71) Applicant: Haier US Appliance Solutions, Inc., Wilmington, DE (US)

(72) Inventors: Katherine Michelle Jansen, Louisville, KY (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/240,878

(22) Filed: Jan. 7, 2019

(65) Prior Publication Data
US 2020/0216340 A1   Jul. 9, 2020

(51) Int. Cl.
| | | |
|---|---|---|
| C02F 1/68 | (2006.01) |
| B01F 3/08 | (2006.01) |
| B05B 7/24 | (2006.01) |
| B01D 27/08 | (2006.01) |
| B01D 27/04 | (2006.01) |
| B01D 27/10 | (2006.01) |

(52) U.S. Cl.
CPC .............. *C02F 1/688* (2013.01); *B01D 27/04* (2013.01); *B01D 27/08* (2013.01); *B01D 27/108* (2013.01); *B01F 3/0865* (2013.01); *B05B 7/2445* (2013.01)

(58) Field of Classification Search
CPC ........ C02F 1/686; C02F 1/688; B01F 3/0865; Y10T 137/87627; B05B 7/2445
See application file for complete search history.

(56) References Cited

U.S. PATENT DOCUMENTS

| | | | | |
|---|---|---|---|---|
| 423,773 | A * | 3/1890 | Jewell ................. | A01C 23/042 |
| | | | | 422/282 |
| 2,135,969 | A * | 11/1938 | Donaldson .............. | A47L 17/00 |
| | | | | 137/599.11 |
| 5,730,178 | A * | 3/1998 | Zhadanov ............. | B01F 5/0495 |
| | | | | 137/268 |
| 6,267,303 | B1 * | 7/2001 | Francis ..................... | B05B 7/30 |
| | | | | 137/893 |
| 6,485,641 | B1 | 11/2002 | McLeod | |
| 2007/0102542 | A1 * | 5/2007 | MacLean-Blevins .... | B05B 7/12 |
| | | | | 239/318 |
| 2008/0011656 | A1 * | 1/2008 | Lacy ........................ | C02F 1/003 |
| | | | | 210/95 |
| 2016/0236945 | A1 | 1/2016 | Floyd | |
| 2018/0016774 | A1 | 1/2018 | Chernov et al. | |

FOREIGN PATENT DOCUMENTS

KR         200475056 Y1    11/2014

* cited by examiner

*Primary Examiner* — Terry K Cecil
(74) *Attorney, Agent, or Firm* — Dority & Manning, P.A.

(57) ABSTRACT

A passive fluid treatment assembly is provided including a passive treatment body defining a primary flow path and a liquid treatment path. The liquid treatment path bypasses a portion of the primary flow path and enters a treatment enclosure through a high pressure port. The fluid entering the high pressure port is treated by a treatment media in the treatment enclosure and exits through a low pressure port into a mixing chamber where it is remixed with the fluid in the primary flow path. A one-way valve is operably coupled to an outlet of the high pressure port for preventing the flow of treated fluid from exiting the treatment enclosure through the high pressure port.

19 Claims, 5 Drawing Sheets

PASSIVE FLUID TREATMENT ASSEMBLY

FIELD OF THE INVENTION

The present subject matter relates generally to fluid treatment and filtration systems, and more particularly to systems for passively treating flowing liquids.

BACKGROUND OF THE INVENTION

During the delivery of liquids, such as water, it may be desirable to treat the liquid to create a treated fluid, filter the fluid by passing it through a filtration media, or otherwise condition the fluid before it reaches a user or consumer. For instance, a user may wish to treat water at a point of entry or a point of use to incorporate or remove certain additives. Conventional passive dosing assemblies or filter assemblies may be used to treat or filter the liquid before use. For example, a shower filter may be mounted inline between a shower water inlet and an outlet fluidly coupled to a showerhead.

However, shower filters or other passive dosing assemblies typically are directly coupled to the pressurized water line. When the water line is supplying water, some or all or the flow of water passes through the filter media which may thereby perform its intended purposes of removing certain additives, particles, etc. However, when the flow of water is stopped, air which was compressed in the media chamber may have a tendency to expand, causing water and filter media to be pushed out of the media chamber and into the supply line. Once the system is at rest, the filter media or solute will continue to diffuse out of the media chamber through a high pressure port since the media is moving from a region of high concentration to low concentration. With filter media diffusing out of the media chamber after each shower, dispensing event, or other use, the rated life of the filter is reduced.

Accordingly, a passive system for fluid treatment would be desirable. In particular, it would be desirable to have a passive system for dosing a liquid or filtering a fluid, such as water, flowing through the system without the use of additional active components and while preventing the filter media or solute from flowing back into a supply line when the flow of liquid ceases.

BRIEF DESCRIPTION OF THE INVENTION

Aspects and advantages of the invention will be set forth in part in the following description, or may be obvious from the description, or may be learned through practice of the invention.

In one aspect of the present disclosure, a passive fluid treatment assembly includes a passive treatment body defining a primary flow path and a discrete liquid treatment path, the primary flow path being defined between a fluid inlet and a fluid outlet, the liquid treatment path being defined between a high pressure port and a low pressure port and bypassing a portion of the primary flow path, the high pressure port being positioned downstream from the fluid inlet, and the low pressure port being positioned downstream from the high pressure port and upstream from the fluid outlet. A pressure plate is disposed within the passive treatment body between the high pressure port and the low pressure port, the pressure plate defining an internal orifice to create a pressure drop between the high pressure port and the low pressure port. A treatment enclosure is positioned in fluid communication between the high pressure port and the low pressure port along the liquid treatment path, the treatment enclosure defining a media chamber housing a treatment media to generate a flow of treated fluid delivered to the primary flow path through the low pressure port. A one-way valve is operably coupled to an outlet of the high pressure port for preventing the flow of treated fluid from exiting the treatment enclosure through the high pressure port.

In another aspect of the present disclosure, a fluid supply system includes a dispensing head defining a water nozzle, a water supply conduit disposed in fluid communication with the dispensing head at a location upstream from the water nozzle, and a passive fluid treatment assembly disposed between the water supply conduit and the dispensing head. The passive fluid treatment assembly includes a passive treatment body defining a primary flow path extending from the water supply conduit to the dispensing head, a liquid treatment path bypassing a portion of the primary flow path and extending between a high pressure port and a low pressure port. A pressure plate is disposed within the passive treatment body between the high pressure port and the low pressure port, the pressure plate defining an internal orifice to create a pressure drop between the high pressure port and the low pressure port. A treatment enclosure is positioned in fluid communication between the high pressure port and the low pressure port along the liquid treatment path, the treatment enclosure defining a media chamber housing a treatment media to generate a flow of treated fluid delivered to the primary flow path through the low pressure port. A one-way valve is operably coupled to an outlet of the high pressure port for preventing the flow of treated fluid from exiting the treatment enclosure through the high pressure port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

Generally, the present subject matter provides a fluid dosing or treatment system that passively generates a dosed or filtered liquid. During use, a supplied liquid, such as water, is provided to a passive fluid treatment assembly which includes a passive treatment body defining a primary flow path and a liquid treatment path. The liquid treatment path bypasses a portion of the primary flow path and enters a treatment enclosure through a high pressure port. The fluid entering the high pressure port is treated by a treatment media in the treatment enclosure and exits through a low pressure port into a mixing chamber where it is remixed with the fluid in the primary flow path. A one-way valve is operably coupled to the outlet of a high pressure channel for preventing the flow of treated fluid from exiting the treatment enclosure through the high pressure port.

Figure 1:
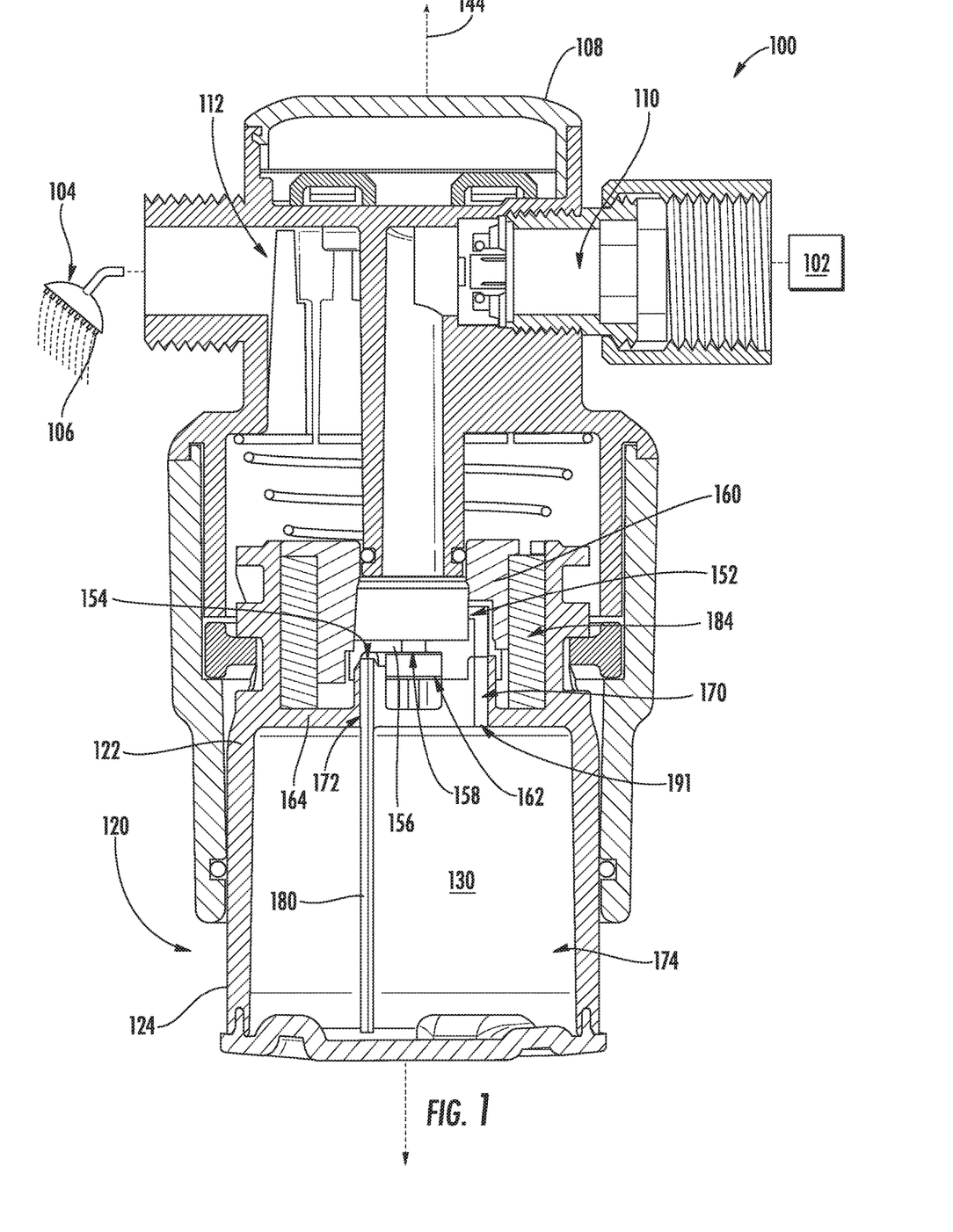
FIG. 1 provides a cross-sectional perspective view of a fluid supply system according to an exemplary embodiment of the present disclosure.
Figure 2:
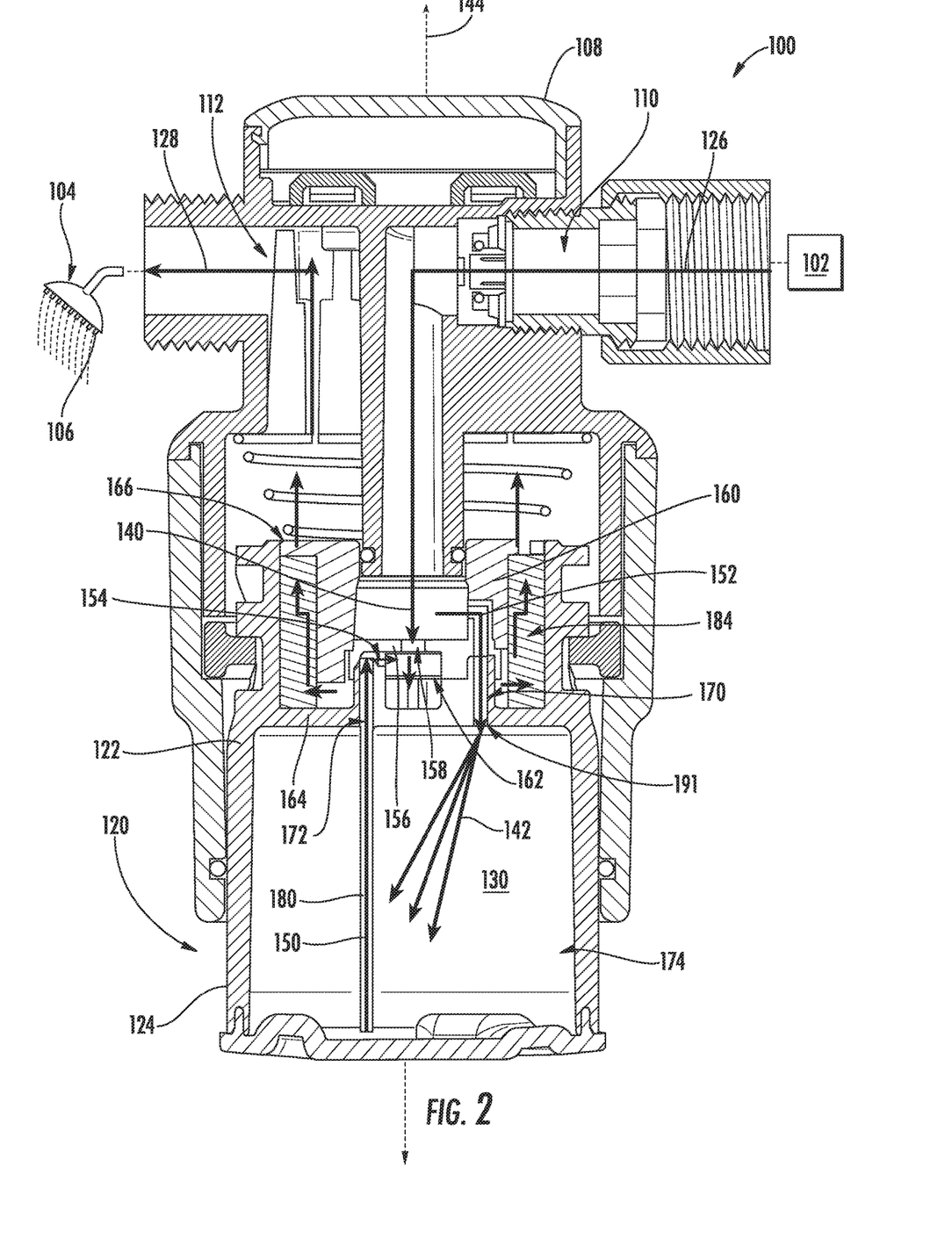
FIG. 2 provides a schematic view of the flow of fluid within the exemplary fluid supply system of FIG. 1.
Figure 3:
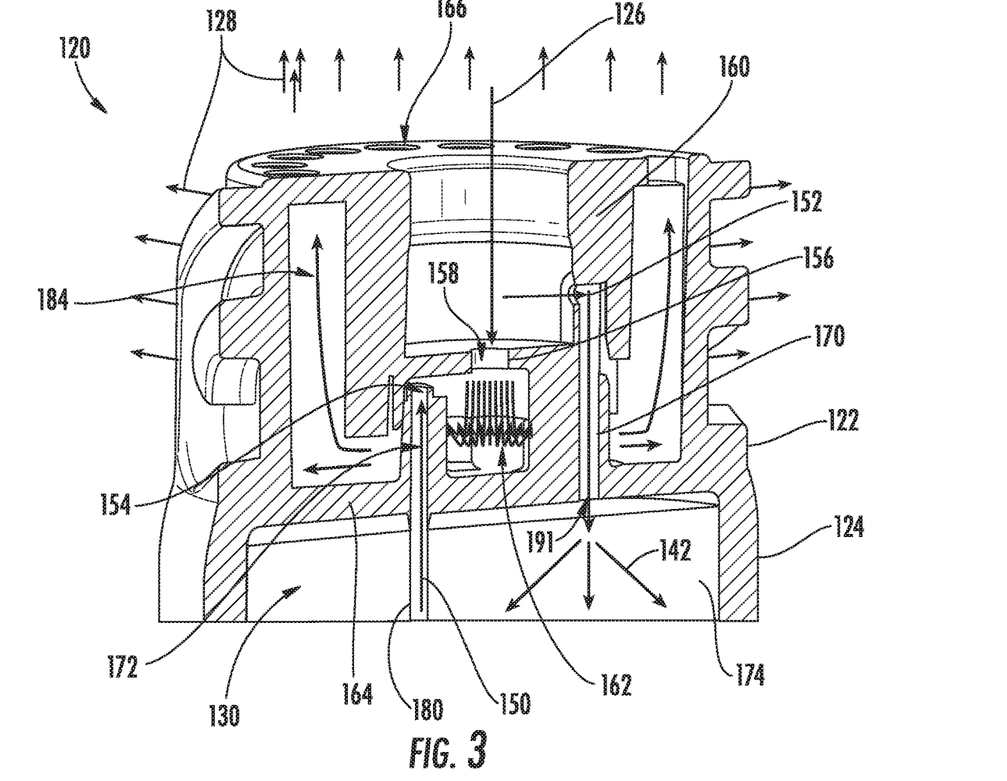
FIG. 3 provides perspective cross sectional view of an exemplary passive fluid treatment assembly and a flow of fluid through the exemplary fluid supply system of FIG. 1.
Figure 4:
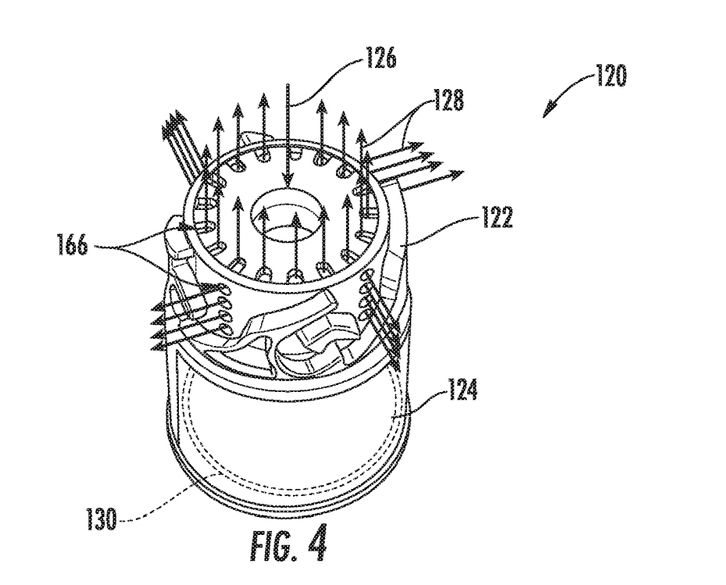
FIG. 4 provides a perspective view of the exemplary passive fluid treatment assembly of FIG. 3.

Turning to the figures, FIGS. 1 and 2 provide cross-sectional views of an exemplary fluid supply system 100. Specifically, FIG. 1 illustrates fluid supply system 100 and FIG. 2 includes exemplary flows of fluid that pass through the fluid supply system 100 during operation. As illustrated, fluid supply system 100 includes a water supply source 102 and a dispensing head 104 defining one or more nozzles 106. In addition, fluid supply system includes a treatment manifold 108 positioned between water supply source 102 and dispensing head 104 for treating the water passing therethrough as described in detail below.

Water supply source 102 may include a pressurized domestic water source, such as a well or municipal water supply, that delivers pressurized water to treatment manifold 108 when assembled. From treatment manifold 108, treated water may be passed to dispensing head 104. Specifically, treatment manifold 108 may define a fluid inlet 110 fluidly coupled to water supply source 102 and a fluid outlet 112 fluidly coupled to dispensing head 104. In addition, one or more suitable water supply conduits may be used to fluidly couple the various components of fluid supply system 100.

Although dispensing head 104 is illustrated as a shower head and treatment manifold 108 is used for receiving unfiltered water from water supply source 102 and providing filtered water through nozzles 106, it should be appreciated that aspects of the present subject matter can be used in any other suitable application. For example, aspects of the present subject matter may be used to treat any suitable liquid with a solute, may be used to filter particulates or minerals from a flow of water, or may be used to condition a flow of fluid in any other suitable manner. In addition, the terms water, liquid, fluid, and the like may be used herein interchangeably. Variations and modifications may be applied while remaining within the scope of the present subject matter.

Referring still to FIGS. 1 and 2, fluid supply system 100 may further include a passive treatment assembly 120. As shown, passive treatment assembly 120 is disposed between water supply source 102 and dispensing head 104 and includes a passive treatment body 122 and a treatment enclosure 124. In this regard, passive treatment body 122 and treatment enclosure 124 are positioned in fluid communication between water supply source 102 and a water output, such as dispensing head 104 (e.g., faucet, spout, shower head, plumbing fixture, etc.) defining one or more water nozzles 106. In addition, passive treatment assembly 120 is generally configured for treating an initial or supplied liquid (e.g., water or untreated fluid as identified by reference numeral 126) that is provided to the passive treatment assembly 120.

Passive treatment assembly 120 is generally configured for treating, filtering, or otherwise conditioning the flow of untreated fluid 126 to create a flow of treated fluid mixture 128 (e.g., filtered water supplied to dispensing head 104). Specifically, during use, a supplied liquid, e.g., untreated fluid 126 may be directed through fluid inlet 110, into passive treatment body 122, and out of fluid outlet 112 to dispensing head 104. As will be described in detail below, at least a portion of untreated fluid 126 passing through passive treatment body 122 may be directed through a media chamber 130 defined by treatment enclosure 124 before being returned as a treated fluid to passive treatment body 122.

Generally, it is understood that the flow of liquid, such as treated fluid, through passive treatment assembly 120 is controlled through passive means. The result may be proportional dosing or filtering of the treated fluid mixture 128 as a function of the flow rate of untreated fluid 126. As a result, no active moving components are required to force liquid into or out of treatment enclosure 124. Since untreated fluid 126 is pressurized when supplied from water supply source 102, no active moving components are required to mix the initial liquid with the treated fluid to generate a treated liquid (e.g., dosed liquid mixture). One or more pressure drops (i.e., differences in pressure) within passive treatment assembly 120 will serve to propel or motivate a portion of the initial liquid into, and through, media chamber 130.

As illustrated in FIGS. 1 through 4, passive treatment body 122 defines multiple flow paths 140, 142 for a supplied or initial liquid (e.g., water or untreated fluid 126) supplied to the passive treatment assembly 120. In some embodiments, these include a primary flow path (indicated by arrows 140) between a fluid inlet 110 and a fluid outlet 112. Fluid inlet 110 may be defined as a substantially cylindrical void extending along a central axis 144 and having a set diameter measured perpendicular to central axis 144.

In exemplary embodiments, such as those illustrated in the figures, primary flow path 140 directs a liquid to the nozzle 106. In this regard, when assembled, the primary flow path 140 extends from water fluid inlet 110 to dispensing head 104. A discrete liquid treatment path (indicated by arrows 142) at least partially defined by passive treatment body 122 is in fluid communication with primary flow path 140 between inlet 110 and fluid outlet 112. Liquid treatment path 142 may divert a portion of the flowing untreated fluid 126 away from primary flow path 140 before returning it to the primary flow path 140, e.g., as a treated fluid (indicated by reference numeral 150), to mix with another portion of the untreated fluid 126. In some such embodiments, the liquid treatment path 142 bypasses a portion of the primary flow path 140.

As shown, a high pressure port 152 and a low pressure port 154 may be defined through passive treatment body 122. Both high pressure port 152 and low pressure port 154 may be positioned along the liquid treatment path 142 to communicate with the primary flow path 140. High pressure port 152 may serve as an inlet to liquid treatment path 142 while low pressure port 154 may serve as an outlet to liquid treatment path 142. High pressure port 152 is positioned downstream from fluid inlet 110 and permits a portion of untreated fluid 126 from the primary flow path 140 to flow into the liquid bypass path 142. Low pressure port 154 is positioned along the liquid treatment path 142 downstream from high pressure port 152 and upstream from dispensing head 104. During use, liquid within the liquid treatment path 142 is returned to the primary flow path 140 from low pressure port 154.

A pressure plate 156 is disposed within the passive treatment body 122 to generate a pressure drop along the primary flow path 140. Relative primary flow path 140, pressure plate 156 is downstream from high pressure port 152 and upstream from low pressure port 154. In some embodiments, pressure plate 156 defines one or more internal orifices 158 that limit the flow of water within the primary flow path 140. An internal orifice 158 of pressure plate 156 may include a diameter that is smaller than the set diameter of fluid inlet 110. In other words, sidewall 160 may define a constant set diameter that is continuous along central axis 144 both above and below pressure plate 156.

During use, pressure plate 156 may create a pressure differential across the internal orifice 158, decreasing pressure immediately downstream from the internal orifice 158 relative to pressure immediately upstream from the internal orifice 158. In other words, two unique pressures may be generated. For example, one pressure (P1) at high pressure port 152 may be generated while a distinct and different pressure (P2) is generated at low pressure port 154. The difference between P1 and P2 defines a pressure drop (ΔP) along the primary flow path 140. As shown, pressure plate 156 may be disposed between high pressure port 152 and low pressure port 154 relative to the primary flow path 140. The pressure drop ΔP across the pressure plate 156 may thus force a portion of untreated fluid 126 into high pressure port 152, through the liquid treatment path 142, and out of low pressure port 154.

Along the primary flow path 140, passive treatment body 122 defines a mixing chamber 162. Mixing chamber 162 may be defined within passive treatment body 122 downstream from the low pressure port 154, as well as upstream from dispensing head 104. In some embodiments, mixing chamber 162 defines a cylindrical void maintaining a constant diameter along the primary flow path 140 downstream from pressure plate 156 and low pressure port 154. Mixing chamber 162 may be in fluid communication with the fluid inlet 110 to receive liquid flowed through the internal orifice 158 of pressure plate 156, as well as liquid exiting low pressure port 154. Within mixing chamber 162, liquid from each flow path 140 and 142 may intermingle before continuing downstream along the primary flow path 140 as treated fluid mixture 128.

In some embodiments, a base plate 164 is disposed downstream from mixing chamber 162 along primary flow path 140. Optionally, base plate 164 may include a substantially planar surface that deflects liquid flow radially outward along liquid flow path. Base plate 164 may extend within passive treatment body 122 and separate primary flow path 140 from the media chamber 130. Optionally, base plate 164 may be disposed perpendicular to mixing chamber 162. Downstream from mixing chamber 162 and radially outward therefrom, passive treatment body 122 may define one or more radial or axial body outlets 166. In some such embodiments, primary flow path 140 extends through body outlet 166 before continuing toward the fluid outlet 112 and dispensing head 104.

As illustrated, exemplary embodiments of base plate 164 define multiple channels 170, 172 along the liquid treatment path 142. For instance, base plate 164 may define a high pressure channel 170 and a separate low pressure channel 172. In some such embodiments, high pressure channel 170 is positioned along the liquid treatment path 142 in fluid communication with high pressure port 152. High pressure channel 170 is provided downstream from high pressure port 152 (e.g., in downstream fluid communication) such that liquid flowing through high pressure port 152 may be delivered to the media chamber 130 through high pressure channel 170. Low pressure channel 172 is positioned along the liquid treatment path 142 in fluid communication with low pressure port 154. Low pressure channel 172 is provided upstream from low pressure port 154 (e.g., in upstream fluid communication) such that liquid flowing to low pressure port 154 may be delivered from the media chamber 130 through low pressure channel 172.

As noted above, a treatment enclosure 124 is provided to define a media chamber 130. A portion of treatment enclosure 124, including media chamber 130, is generally positioned along the liquid treatment path 142. In some such embodiments, treatment enclosure 124 is positioned in fluid communication between high pressure port 152 and low pressure port 154 along the liquid treatment path 142. Within the media chamber 130, treatment enclosure 124 may house a treatment media 174. Treatment media 174 may be generally configured to generate treated fluid 150 when the untreated fluid 126 is introduced, e.g., through high pressure channel 170. In some embodiments, untreated fluid 126 that includes water is supplied to media chamber 130.

The introduction of water to the treatment media 174 may force a portion of the treatment media 174 to dissolve into water, thereby generating the treated fluid 150. After the treated fluid 150 has been generated, at least a portion of the treated fluid 150 may be delivered to the primary flow path 140, e.g., through low pressure channel 172. Specific treatment media 174 may be provided according to the desired treated fluid 150 or dosed liquid to be delivered by the passive treatment assembly 120. In some embodiments, a redox agent, such as a chlorine and or chloramine-neutralizing agent (e.g., potassium metabisulfite, sodium metabisulfite, sodium bisulfite, sodium ascorbate, ascorbic acid, or another suitable agent), may be included as part of the treatment media 174.

In optional embodiments, a treatment media 174 within media chamber 130 may include a particle exclusion filter for physically or mechanically removing particles or contaminants from the flow of untreated fluid 126 passing through media chamber 130. In this regard, treatment media 174 may include one or more suitable media (e.g., activated carbon, rigid fine mesh, pleated paper, melt blown polypropylene, open cell foam, and/or kinetic degradation fluxion media) to filter certain contaminants and further mix the treated fluid 150 flowing therethrough.

In certain embodiments, one or more capillary tubes 180 may be disposed through one or more of discrete channels 170, 172. For instance, a low pressure capillary tube 180 may extend into passive treatment body 122 through low pressure channel 172. In some embodiments, low pressure capillary tube 180 is provided in fluid communication between media chamber 130 and low pressure port 154.

Capillary tube 180 may extend at least partially through media chamber 130. As illustrated, during use, liquid generally flows along the liquid treatment path 142 from high pressure port 152, through high pressure port 152, and into media chamber 130. From media chamber 130, liquid flows along the liquid treatment path 142, through low pressure capillary tube 180, and to low pressure port 154.

The size of the capillary tube 180 (e.g., the internal tube diameter and tube length) may be tuned according to the desired dosing of liquid from the media chamber 130, e.g., as a function of the pressure drop and/or flow rate of dosed liquid from the passive treatment assembly 120. In addition, the size of the capillary tubes may be tuned to compensate for a known dynamic viscosity of the untreated fluid 126 and/or a known dynamic viscosity of the treated fluid 150.

In optional embodiments, a secondary filtration chamber 184 is provided along the path of treated fluid mixture 128. For instance, secondary filtration chamber 184 may be disposed downstream of mixing chamber 162 and/or upstream of body outlet 166. Secondary filtration chamber 184 may be provided as an annular member, e.g., a ring, disposed about passive treatment body 122. In some such embodiments, secondary filtration chamber 184 is disposed about body outlet 166 to direct the treated fluid 150 therethrough. Secondary filtration chamber 184 may include one or more secondary filtration media. In some such embodiments, secondary filtration media includes one or more suitable media (e.g., activated carbon, rigid fine mesh, pleated paper, melt blown polypropylene, open cell foam, and/or kinetic degradation fluxion media) to filter certain contaminants and further mix the treated fluid 150 flowing therethrough.

Aspects of the present subject matter provide a passive fluid treatment assembly 120 for filtering, treating, or otherwise conditioning a flow of liquid (e.g., untreated fluid 126). For example, in a shower filter application, media chamber 130 may be filled with a filter media, such as a filter powder or a high density slurry (e.g., a combination of water and powder). Similarly, in a fluid treatment application including dosing of a treatment agent or solute, media chamber 130 may be filled with a dosing solute which is mixed with the fluid delivered to media chamber 130. In some embodiments, a redox agent, such as a chlorine and or chloramine-neutralizing agent (e.g., potassium metabisulfite, sodium metabisulfite, sodium bisulfite, sodium ascorbate, ascorbic acid, or another suitable agent), may be included as part of the treatment media or solute. Notably, several different applications of the present subject matter are described herein, such as a particle exclusion filtration and a dosed treatment application. However, due to the similarity of function between the systems, regardless of the type of treatment performed, the terms treatment, filtration, dosing, and the like may be used interchangeably herein.

Using the shower filter application as an example, the intended function of such a filter is to facilitate the flow of water into media chamber 130 from high pressure port 152 and out of media chamber 130 through low pressure port 154. Indeed, this is what occurs during normal shower operation when the system is pressurized. Specifically, during normal shower operation, media chamber 130 starts to fill with water and the small amount of air inside media chamber 130 is compressed. Once the shower is initially turned off, the air that was compressed starts to expand. With conventional fluid treatment assemblies, this phenomenon would cause an overdose of media/water to be pushed out of media chamber 130 through high pressure port 152, and such media will continue to diffuse out of media chamber 130 through high pressure port 152 since the media is moving from a region of high concentration to low concentration. Notably, with media diffusing out of media chamber 130 through high pressure port 152 after each shower (which is not the intended function) or use of the fluid treatment assembly, the rated life of the fluid treatment assembly 120 is reduced.

Figure 5:
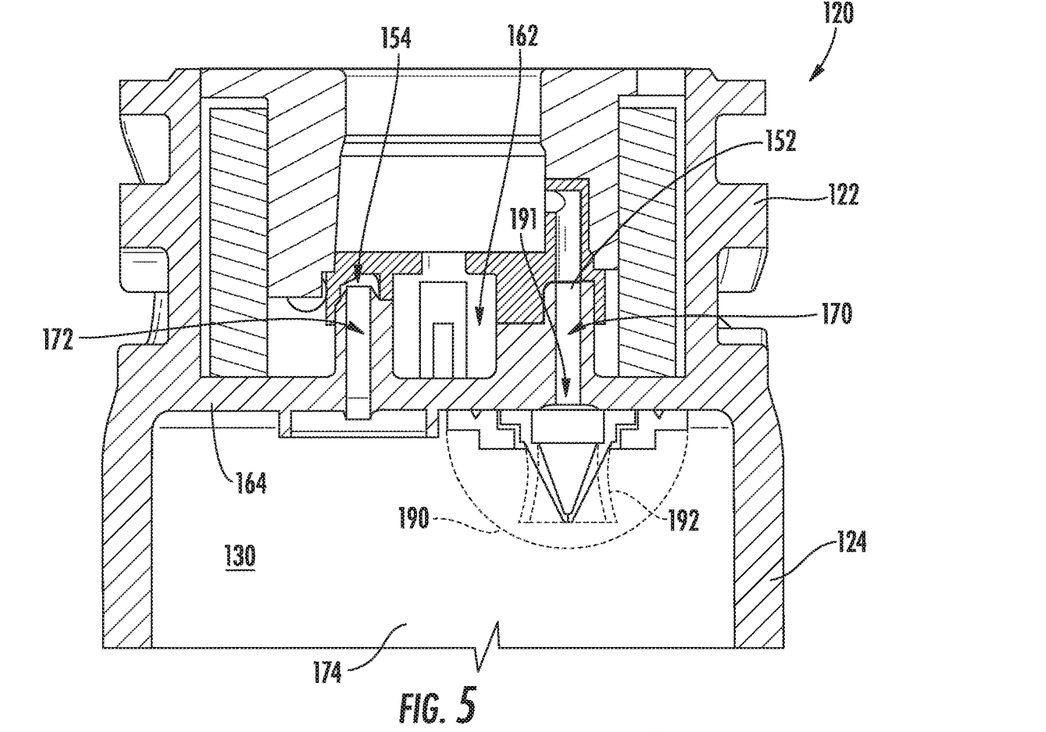
FIG. 5 provides a simplified, cross sectional view of the exemplary passive fluid treatment assembly of FIG. 3 with a one-way duckbill valve.
Figure 6:
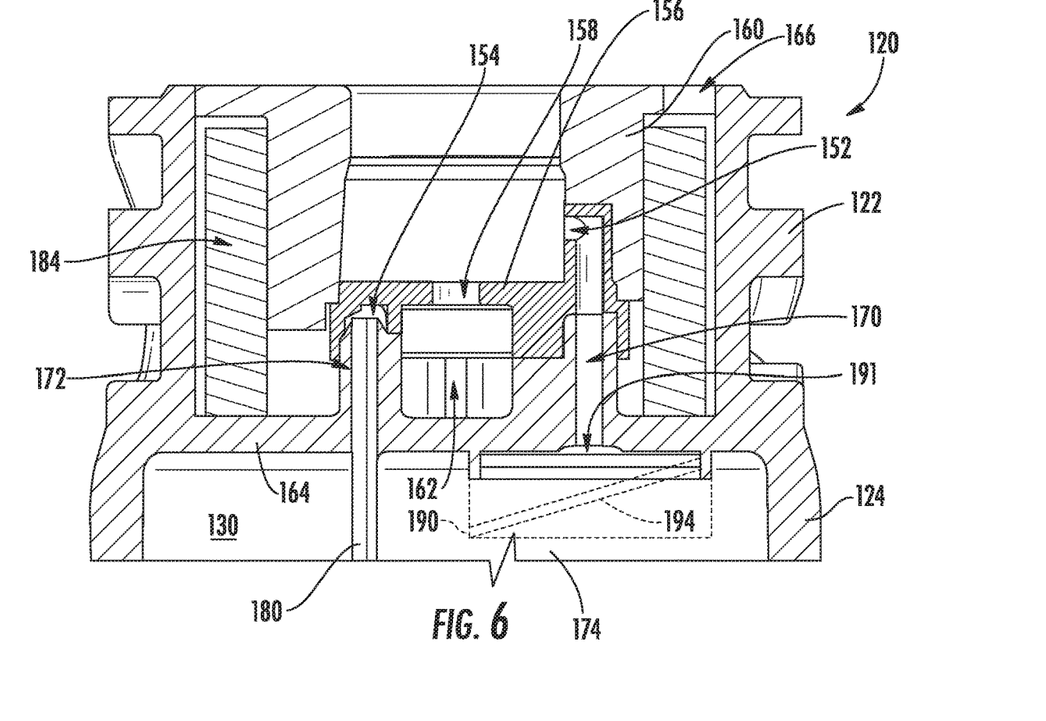
FIG. 6 provides another simplified, cross sectional view of the exemplary passive fluid treatment assembly of FIG. 3 with a one-way flapper valve.
Figure 7:
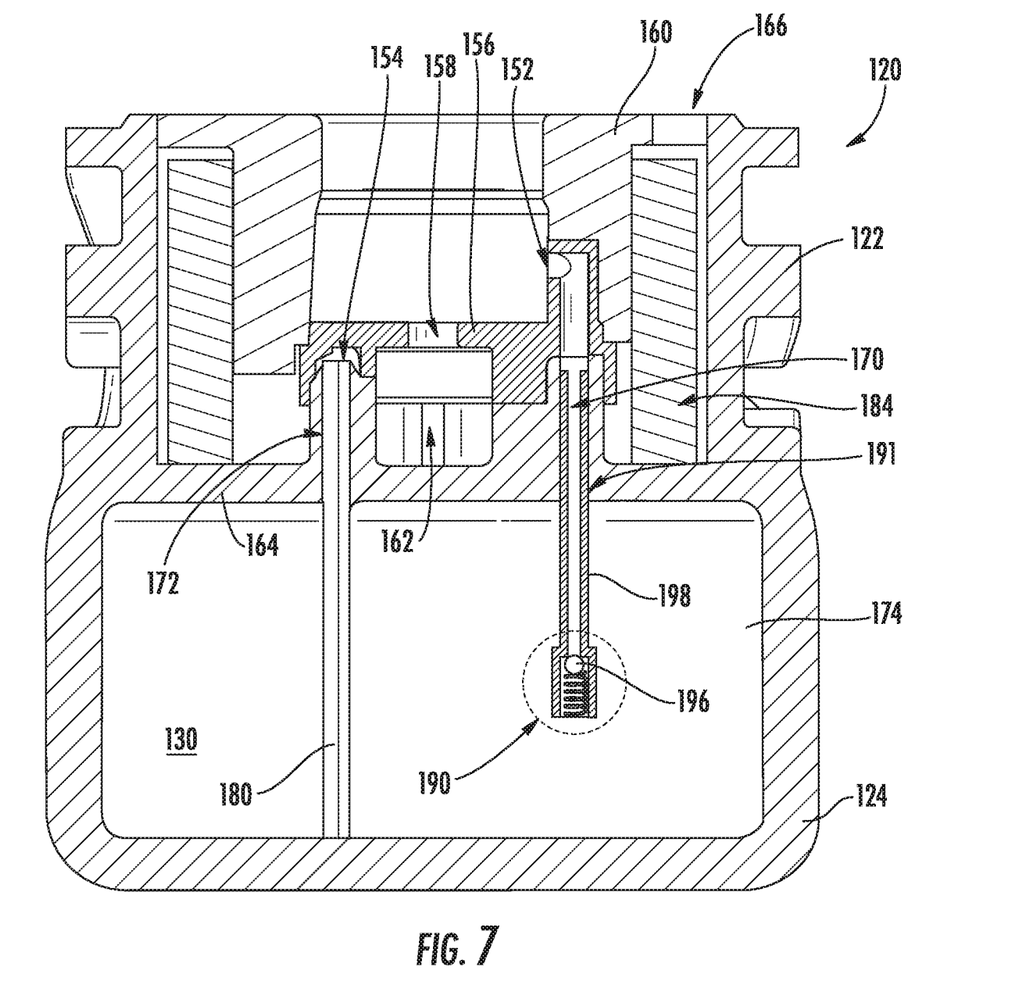
FIG. 7 provides another simplified, cross sectional view of the exemplary passive fluid treatment assembly of FIG. 3 with a one-way ball valve.

However, as illustrated in FIGS. 5 through 7, aspects of the present subject matter are directed to the introduction of a one-way valve 190 into passive treatment assembly 120 to rectify the above issues. Specifically, as illustrated, one-way valve 190 is operably coupled to an outlet 191 of high pressure port 152 for preventing the flow of treated fluid 150 from exiting treatment enclosure 124 through high pressure port 152. Thus, one way valve 190 is generally configured to permit the flow of untreated fluid 126 to enter media chamber 130 through high pressure port 152 when water supply source 102 is providing pressurized water (e.g., when a valve associated with dispensing head 104 is open). By contrast, when pressurized water is no longer being supplied, one way valve 190 prevents the flow of treated fluid 150, treatment media 174, or other fluid from within media chamber 130 to flow back through high pressure port 152.

In general, one way valve 190 may be any valve, device, or mechanism suitable for preventing the flow of fluid in a reverse direction through high pressure port 152. For example, as illustrated in FIG. 5, one way valve 190 is a duckbill valve 192 positioned over high pressure channel 170. Duckbill valve 192 is formed from a resilient material that flexes between an open position (e.g., illustrated by dotted lines in FIG. 5) and a closed position (e.g., illustrated by solid lines in FIG. 5). Specifically, when untreated fluid 126 is supplied through high pressure port 152 toward media chamber 130, duckbill valve 192 may flex open to permit the untreated fluid 126 to enter media chamber 130. By contrast, when the flow of untreated fluid 126 stops (e.g., when water supply source 102 stops supplying pressurized water), the resilient duckbill valve 192 returns to its closed position and prevents fluid from passing through high pressure port 152.

According to an alternative embodiment illustrated in FIG. 6, one way valve is a flapper valve 194. Flapper valve 194 operates similar to the duckbill valve, but is typically a pivoting flap instead of a resilient nozzle. In this manner, flapper valve 194 may pivot from one end between a closed position (e.g., illustrated by solid lines in FIG. 6) and an open position (e.g., illustrated by dotted lines in FIG. 6). According to still another embodiment illustrated in FIG. 7, the one way valve 190 may be a ball valve 196 positioned at a distal end of a ball valve housing 198 positioned over outlet 191 of high pressure port 152.

Although exemplary positions and configurations of one way valve 190 are illustrated herein, it should be appreciated that any suitable device or mechanism having any suitable position or configuration for preventing backflow of treated fluid 150 may be used according to alternative embodiments. For example, one way valve 190 is illustrated as being positioned at least partially within media chamber 130, but could be positioned proximate sidewall 160 or at any other suitable location. In addition, one way valve 190 may include, but is not limited to, a duckbill valve, a slit valve, a flapper valve, a ball valve, a piston valve, a solenoid valve, or any other suitable type of valve.

In general, adding a one way valve 190 in the filter media chamber 130 on the outlet 191 of the of high pressure port 152 or channel 170 will allow fluid flow to come into the media chamber 130, but will prevent the treatment media 174 from diffusing out through the high pressure port 152. Thus, the fluid will come into the media chamber 130 through the high pressure port 152, and exit the media chamber 130 through the low pressure port 154, as it is intended to function. The key functions of the one way valve 190 in the media chamber 130 include reduction of media diffusion at rest, increased filter capacity, and reduction of media overdose at system shutdown. Each of these will be described below.

One problem or challenge that is addressed or solved by including a one way valve 190 on the outlet 191 of the high pressure port 152 or channel 170 is the diffusion of treatment media 174 or solute at rest. Specifically, the one way valve 190 helps to retain treatment media 174 and water inside of media chamber 130 that may otherwise diffuse back out of media chamber 130 through high pressure port 152 when the system is at rest. In this regard, there is no fluid communication through high pressure port 152 when the system is at rest. Reducing the media and water diffusion out of high pressure port 152, which is not the intended filter function, will increase the life of the filter or treatment media 174.

Another problem or challenge that is addressed or solved by including a one way valve 190 on the outlet 191 of the high pressure port 152 or channel 170 is treatment media 174 capacity. Specifically, the one way valve 190 increases treatment media 174 capacity (e.g., enables longer filter life) or provides overall treatment capacity increase. In this regard, adding a one way valve 190 at the outlet 191 of the high pressure port 152 or channel 170 allows water-based media filling methods, which results in a higher density media. Specifically, with the one way valve 190 in place, a high density slurry media (water+powder) can be used instead of the low density powder. Using a higher density slurry media increases both the filter capacity and overall life of the filter. Without the one way valve 190 in place, the water is able to leak and drip out of the high pressure port 152 during shipping and handling. Therefore, this slurry media filling method is only feasible with a one way valve 190 assembled at the media chamber 130 inlet (i.e., outlet 191 of high pressure port 152 or channel 170).

Still another problem or challenge that is addressed or solved by including a one way valve 190 on the outlet 191 of the high pressure port 152 or channel 170 is the reduction of media overdose at initial system shutdown. Specifically, the one way valve 190 reduces or prevents media overdose at shutdown because the use of a high density slurry with the one way valve 190 reduces the amount of trapped air in the media chamber 130. In this regard, when the system is pressurized, trapped air inside the media chamber 130 will compress. When the system is depressurized, the trapped air inside the media chamber 130 will expand. The air expansion will try to force the water/media out of the media chamber 130 through the high pressure port 152 at the initial system shutdown (not the intended function). However, the slurry will reduce the amount of trapped air in the media chamber 130 compared to the powder and the one way valve 190 will prevent the media overdose at shutdown since fluid will not flow back through the high pressure port 152. In addition, by having less trapped air in the media chamber 130, the filter capacity and filter life is increased.

Notably, the use of a one way valve 190 is described herein for use with fluid supply system 100 including a dispensing head 104 in the form of a shower head or other plumbing fixture. However, it should be appreciated that aspects of the present subject matter may be applied to the dispensing or dosing of any suitable liquid using any suitable filtering mechanism or dosing configuration. In other words, the one way valve 190 used in the media chamber 130 on the outlet 191 of the high pressure port 152 or channel 170 can be used in various dosing mechanism applications and technologies, not just specifically for shower filters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A passive fluid treatment assembly comprising:
   a passive treatment body defining a primary flow path and a discrete liquid treatment path, the primary flow path being defined between a fluid inlet and a fluid outlet, the liquid treatment path being defined between a high pressure port and a low pressure port and bypassing a portion of the primary flow path, the high pressure port being positioned downstream from the fluid inlet, and the low pressure port being positioned downstream from the high pressure port and upstream from the fluid outlet;
   a pressure plate disposed within the passive treatment body between the high pressure port and the low pressure port, the pressure plate defining an internal orifice to create a pressure drop between the high pressure port and the low pressure port;
   a base plate separating the primary flow path from a media chamber, the base plate being substantially parallel to the pressure plate such that a flow of untreated fluid strikes the base plate and is deflected outward along a radial direction;
   a treatment enclosure positioned in fluid communication between the high pressure port and the low pressure port along the liquid treatment path, the treatment enclosure defining the media chamber housing a treatment media to generate a flow of treated fluid delivered to the primary flow path through the low pressure port; and
   a one-way valve operably coupled to an outlet of the high pressure port for preventing the flow of treated fluid from exiting the treatment enclosure through the high pressure port.

2. The passive fluid treatment assembly of claim 1, wherein the one-way valve is a duckbill valve.

3. The passive fluid treatment assembly of claim 1, wherein the one-way valve is a flapper valve.

4. The passive fluid treatment assembly of claim 1, wherein the one-way valve is a ball valve.

5. The passive fluid treatment assembly of claim 1, wherein the one-way valve is positioned at least partially within the media chamber.

6. The passive fluid treatment assembly of claim 1, further comprising:
a high density slurry media within the media chamber.

7. The passive fluid treatment assembly of claim 1, wherein the passive treatment body further defines a mixing chamber along the primary flow path downstream from the pressure plate and the low pressure port.

8. The passive fluid treatment assembly of claim 1, wherein the base plate defines a high pressure channel and a low pressure channel along the liquid treatment path, wherein the high pressure channel is positioned in downstream fluid communication with the high pressure port, and wherein the low pressure channel is positioned in upstream fluid communication with the low pressure port.

9. The passive fluid treatment assembly of claim 8, further comprising:
a low pressure capillary tube extending through the low pressure channel in fluid communication along the liquid treatment path between the media chamber and the low pressure port.

10. The passive fluid treatment assembly of claim 1, wherein the treatment media includes a redox agent disposed within media chamber.

11. The passive fluid treatment assembly of claim 10, wherein the redox agent is a chlorine-neutralizing agent or a chloramine-neutralizing agent.

12. The passive fluid treatment assembly of claim 1, wherein the treatment media includes a particle exclusion filtration media.

13. The passive fluid treatment assembly of claim 1, further comprising:
a secondary filtration media disposed along the flow of treated fluid downstream from a mixing chamber.

14. A fluid supply system comprising:
a dispensing head defining a water nozzle;
a water supply conduit disposed in fluid communication with the dispensing head at a location upstream from the water nozzle;
a passive fluid treatment assembly disposed between the water supply conduit and the dispensing head, the passive fluid treatment assembly comprising:
a passive treatment body defining a primary flow path extending from the water supply conduit to the dispensing head, a liquid treatment path bypassing a portion of the primary flow path and extending between a high pressure port and a low pressure port;
a pressure plate disposed within the passive treatment body between the high pressure port and the low pressure port, the pressure plate defining an internal orifice to create a pressure drop between the high pressure port and the low pressure port;
a base plate separating the primary flow path from a media chamber, the base plate being substantially parallel to the pressure plate such that a flow of untreated fluid strikes the base plate and is deflected outward along a radial direction;
a treatment enclosure positioned in fluid communication between the high pressure port and the low pressure port along the liquid treatment path, the treatment enclosure defining the media chamber housing a treatment media to generate a flow of treated fluid delivered to the primary flow path through the low pressure port; and
a one-way valve operably coupled to an outlet of the high pressure port for preventing the flow of treated fluid from exiting the treatment enclosure through the high pressure port.

15. The fluid supply system of claim 14, wherein the one-way valve is a duckbill valve.

16. The fluid supply system of claim 14, wherein the one-way valve is a flapper valve.

17. The fluid supply system of claim 14, wherein the one-way valve is a ball valve.

18. The fluid supply system of claim 14, wherein the one-way valve is positioned at least partially within the media chamber.

19. The fluid supply system of claim 14, wherein the passive treatment body further defines a mixing chamber along the primary flow path downstream from the pressure plate and the low pressure port.

* * * * *